UNITED STATES PATENT OFFICE.

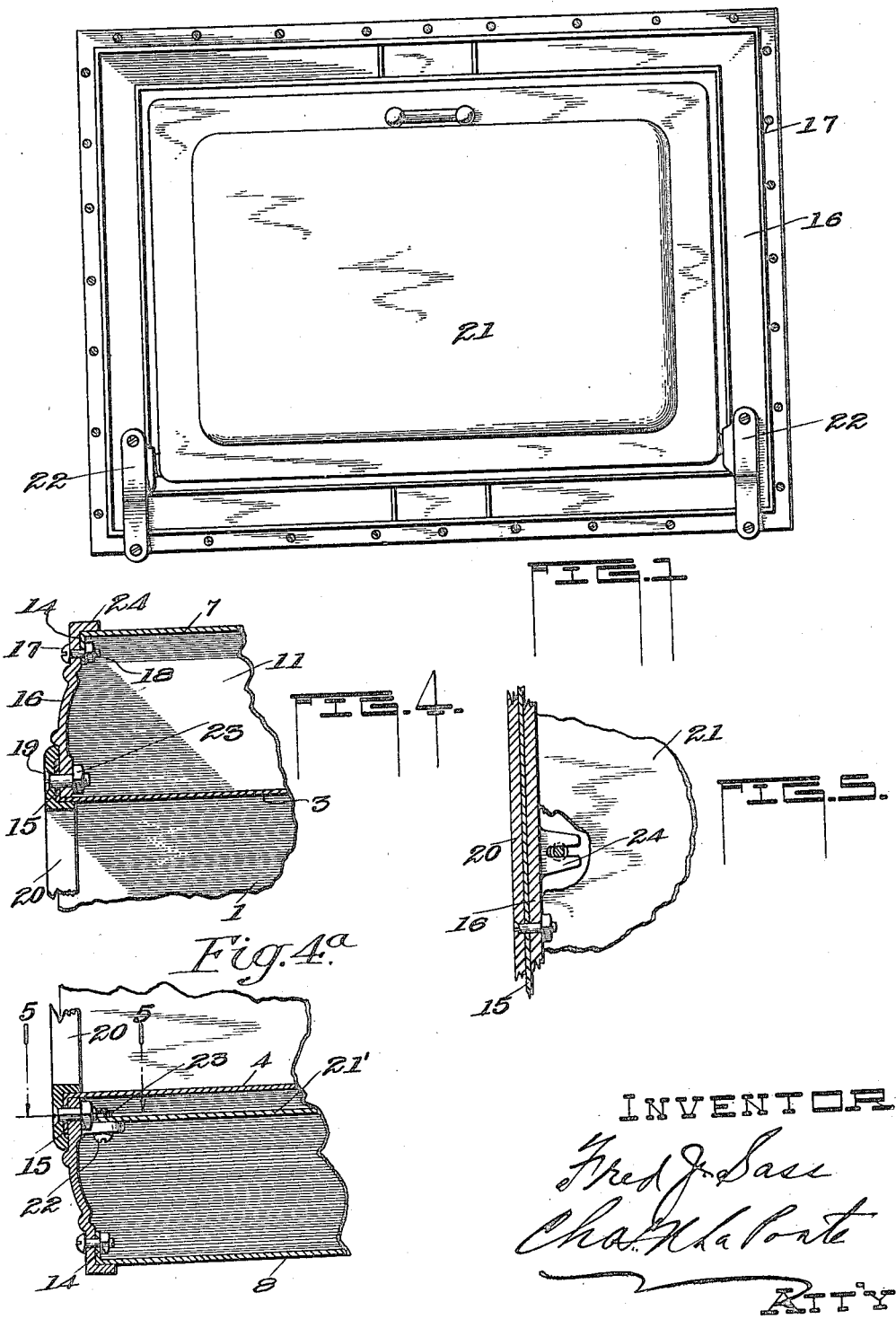

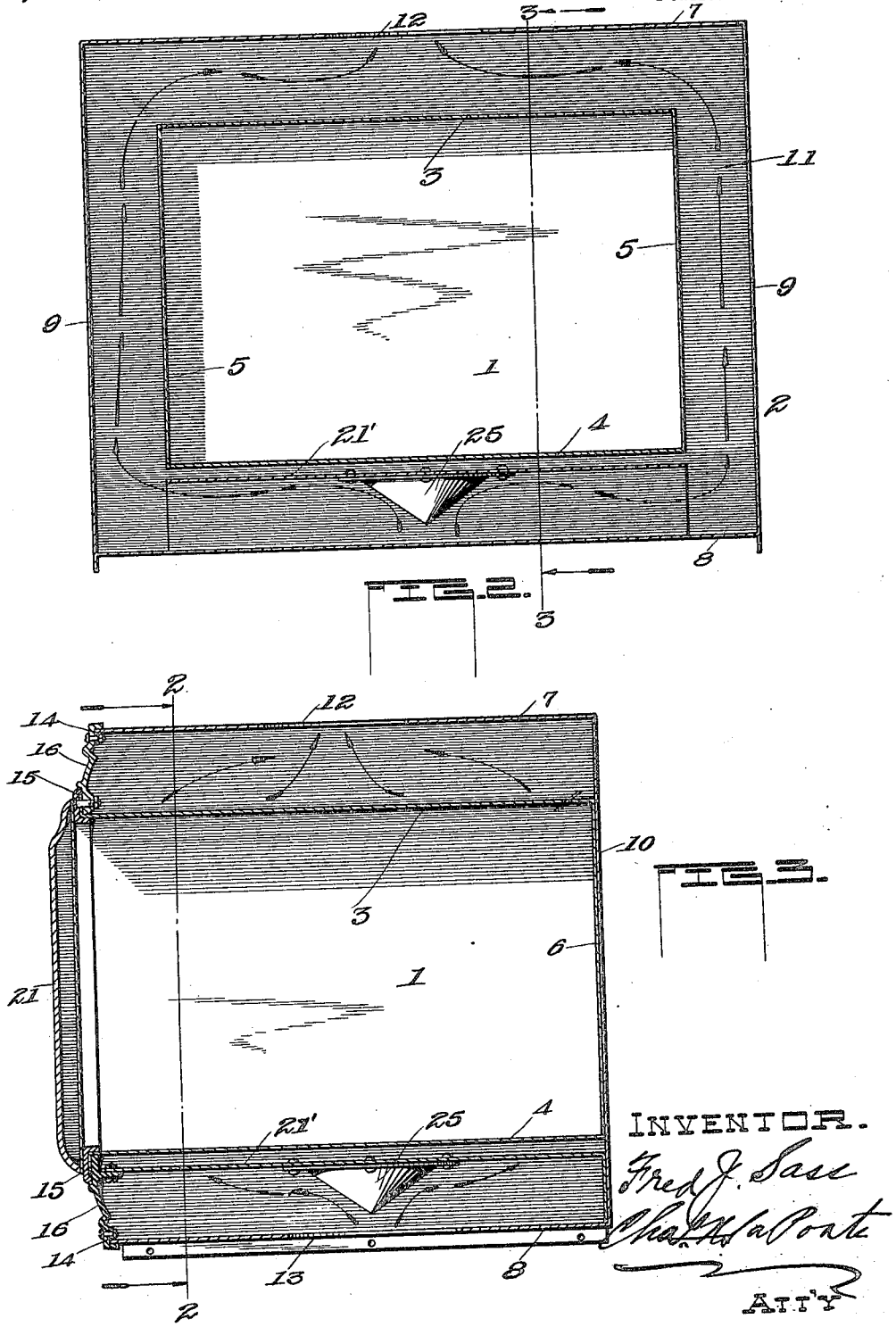

FRED J. SASS, OF PEORIA, ILLINOIS, ASSIGNOR TO CULTER & PROCTOR STOVE CO., OF PEORIA, ILLINOIS, A CORPORATION OF ILLINOIS.

STOVE OR RANGE.

1,384,157.

Specification of Letters Patent.   Patented July 12, 1921.

Application filed September 7, 1918.   Serial No. 253,072.

*To all whom it may concern:*

Be it known that I, FRED J. SASS, a citizen of the United States, a resident of Peoria, in the county of Peoria and State of Illinois, have invented new and useful Improvements in Stoves or Ranges, of which the following is a specification.

This invention has reference to stoves or ranges, and relates particularly to the construction of the oven which is elevated above the range proper and connected therewith by an upstanding flue.

My invention resides in the improved front construction of the oven which unites the walls of the inner receptacle with the walls of the outer casing, and also supports the oven-door.

That the invention may be more fully understood, reference is had to the accompanying drawings, in which,—

Figure 1 is a front elevation of the oven, the upstanding supporting flue being omitted;

Fig. 2 is a front vertical cross-section, as the same would appear, if taken on the line 2—2 of Fig. 3;

Fig. 3 is a side vertical cross-section, as the same would appear, if taken on the line 3—3 of Fig. 2;

Figs. 4 and 4ª show a cross-section, somewhat similar to Fig. 3, except that it is broken away and the front construction is shown in detail on a much larger scale;

Fig. 5 is a sectional detail in plan, as the same would appear, if taken on the line 5—5, Fig. 4.

Like characters of reference denote corresponding parts throughout the figures.

The oven comprises an inner receptacle 1 and an outer casing 2. The inner receptacle has top and bottom walls 3 and 4, side walls 5 and a rear wall 6. The outer casing has top and bottom walls 7 and 8 spaced from the walls 3 and 4 of the inner receptacle, side walls 9, also spaced from the walls 5 of the inner receptacle, and a rear wall 10 which is preferably, in juxtaposition to the rear wall 6 of the inner receptacle. The separation of the top and bottom and side walls of the inner receptacle and outer casing, provides a flue 11 around the inner receptacle for the heat to pass. The top wall 7 of the outer casing has a heat egress opening 12, and the lower wall 8 of said outer casing has a heat ingress opening 13.

The top and bottom walls 7 and 8, and side walls 9 of the outer casing 2, at the front of the oven, are flanged as at 14, said flanges being turned inwardly, and mitered at the corners, as will be understood, although not shown.

The top and bottom walls 3 and 4 and side walls 5 of the inner receptacle 1, at the front of the oven, are flanged as at 15, said flanges being turned outwardly and mitered at the corners, as will be understood, although not shown.

16 designates a, preferably, rectangular front plate to which is united the top and bottom and side walls, of both the inner receptacle and outer casing, by means of bolts 17 passing through the flanges 14 and said plate and secured by nuts 18, and by means of bolts 19 passing through the flanges 15, the plate 16 and also a thimble 20 surrounding the opening to the interior of the inner receptacle, adapted to be closed by the oven door 21 hinged at 22, nuts 23 securing the bolts 19 in place.

The plate 16 overlies the front face of the flanges 14 of the outer casing, and is also flanged as at 24 to extend around and protect the corner edges of the front of the outer casing. Said plate 16 lies behind the flanges 15 of the inner receptacle, so that the thimble 20 overlies the front face of said flanges 15, and said plate is angled so as to protect the corner edges of the front of the inner receptacle.

Uniting the rear walls of the inner receptacle and outer casing, and joining such walls at the front of the oven by the novel means, above described, provides a very rigid oven construction.

To deflect the heat entering the flue 11, through the opening 13 in the bottom wall of the outer casing, so that it will pass entirely around and over the top and bottom and side walls of said inner receptacle, and out through the opening 12 in the upper wall of said outer casing, I provide the deflecting plate 21', set in the flue 11 beneath the bottom wall 4 of the inner receptacle, the rear of said plate 21' being bent downwardly and lying against the rear wall 10 of the outer casing. The front portion of said plate 21 is bolted, by means of bolts 22 and nuts 23 to ears 24 extending inwardly from the front plate 16. Depending from the deflecting plate 21 and centered immediately above the opening 13 in the bottom wall of the outer casing, is a preferably inverted cone shaped member 25, the function of which is very clearly shown, in Figs. 2 and 3.

It is obvious that various changes may be made in the construction of the oven, without departing from the spirit and scope of the invention, and I, therefore, do not wish to be limited, except as specifically set forth in the appended claims.

What I claim is:—

1. An oven including an outer casing and an inner receptacle having walled rear ends in juxtaposition, open front ends, and spaced relatively to each other to provide a flue surrounding the sides and top and bottom of said receptacle, the walls constituting the inner receptacle and outer casing, at the front of the oven, being formed respectively, with flanges bent toward each other, an approximately flat rectangular plate spanning the open end of said flue and closing the same and connected to the flanges of said inner receptacle and outer casing, a thimble connected to said plate and surrounding the opening leading into the inner receptacle, and a hinged door to close said opening.

2. An oven including an outer casing and an inner receptacle forming the oven proper, the walls constituting said inner receptacle and outer casing, at the front of the oven being flanged, a rectangular plate connecting said flanges, and a thimble, said thimble connected to said rectangular plate and flanges of the walls of the inner receptacle.

3. An oven including an outer casing and an inner receptacle forming the oven proper, the walls of the outer casing, at the front, being flanged inwardly, the walls of the inner receptacle, at the front being flanged outwardly, a rectangular plate connecting said flanges, and a thimble, said thimble connected to said rectangular plate and flanges of the walls of the inner receptacle, and surrounding the opening leading to said inner receptacle.

4. An oven including an outer casing and an inner receptacle forming the oven proper, the walls of the outer casing, at the front, being flanged inwardly, the walls of the inner receptacle, at the front, being flanged outwardly, a front plate, said plate being placed in front of the flanges of the walls of the outer casing and in the rear of the flanges of the walls of the inner receptacle, and bolts and nuts securing said plate to said flanges.

5. An oven, including an outer casing and an inner receptacle forming the oven proper, the walls of the outer casing at the front, being flanged inwardly, the walls of the inner receptacle, at the front, being flanged outwardly, a front plate, said plate being placed in front of the flanges of the walls of the outer casing and in the rear of the flanges of the walls of the inner receptacle, bolts and nuts securing said plate to said flanges, and a thimble also bolted to said plate and flanges of the walls of the inner receptacle, and overlying said flanges.

6. An oven including an outer casing and an inner receptacle having walled rear ends in juxtaposition, open front ends, and spaced relatively to each other to provide a flue surrounding the sides and top and bottom of said receptacle, the bottom wall of said casing having a heat ingress opening to said flue, a deflector plate located below said receptacle and above said heat ingress opening and extending from the rear wall of said casing to the front thereof but in width conforming to the width of said inner receptacle, an inverted cone shaped member depending from said deflector plate and centered over said heat ingress opening, and an open rectangular front plate connecting the walls of the inner receptacle and outer casing to close the front of said flue and also having connection with said deflector plate.

7. An oven including an outer casing and an inner receptacle forming the oven proper, a rectangular front plate connecting the top, bottom and side walls of said casing and receptacle, the bottom wall of said casing having a heat ingress opening, a deflector plate interposed between the bottom walls of the inner receptacle and outer casing, ears extending inwardly from said front plate, bolts securing said deflector plate to said front plate, and an inverted cone shaped member depending from said plate and centered over said heat ingress opening.

In witness whereof, I have hereunto affixed my hand.

FRED J. SASS.